US007809354B2

(12) United States Patent
Calhoun et al.

(10) Patent No.: US 7,809,354 B2
(45) Date of Patent: Oct. 5, 2010

(54) DETECTING ADDRESS SPOOFING IN WIRELESS NETWORK ENVIRONMENTS

(75) Inventors: Patrice R. Calhoun, Pleasanton, CA (US); Nancy Cam-Winget, Mountain View, CA (US); Mark Krischer, Pymble (AU); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 423 days.

(21) Appl. No.: 11/377,151

(22) Filed: Mar. 16, 2006

(65) Prior Publication Data

US 2007/0218875 A1    Sep. 20, 2007

(51) Int. Cl.
*H04M 1/66* (2006.01)
*H04M 1/68* (2006.01)
*H04M 3/16* (2006.01)

(52) U.S. Cl. .......................... 455/411; 455/410; 726/1; 726/2; 726/3; 726/4; 726/5; 726/6

(58) Field of Classification Search .................. 455/411; 726/1, 2, 3, 4, 5, 6
See application file for complete search history.

(56) References Cited

U.S. PATENT DOCUMENTS

| 6,820,124 B1* | 11/2004 | Clough ....................... 709/229 |
| 2004/0059909 A1* | 3/2004 | Le Pennec et al. .......... 713/153 |
| 2004/0215980 A1* | 10/2004 | Hamid ....................... 713/201 |
| 2004/0243846 A1* | 12/2004 | Aboba et al. ................ 713/201 |
| 2005/0111466 A1* | 5/2005 | Kappes et al. .............. 370/400 |
| 2006/0031924 A1* | 2/2006 | Kwon et al. ................... 726/2 |
| 2006/0059538 A1* | 3/2006 | Lee ................................ 726/1 |
| 2006/0150250 A1* | 7/2006 | Lee et al. ....................... 726/23 |
| 2006/0242685 A1* | 10/2006 | Heard et al. ................... 726/3 |
| 2006/0288204 A1* | 12/2006 | Sood et al. .................. 713/161 |
| 2007/0162751 A1* | 7/2007 | Braskich et al. ............. 713/169 |
| 2007/0180499 A1* | 8/2007 | Van Bemmel ................. 726/4 |
| 2007/0192832 A1* | 8/2007 | Qi et al. ........................ 726/3 |
| 2007/0199044 A1* | 8/2007 | Hughes ......................... 726/1 |

OTHER PUBLICATIONS

Agilent Technologies, *JTC 013 Source Address Spoofing Detection*, Jan. 2006.
Schmoyer, Timothy R., et al., *Wireless Instrusion Detection and Response*, Georgia Institute of Technology, Jan. 2006.
Bellardo, John, et al., *802.11 Denial-of-Service Attacks: Real Vulnerabilities and Practical Solutions*, Department of Computer Science and Engineering, University of California at San Diego, Jan. 2006.
Wright, Joshua, GCIH, CCNA, *Detecting Wireless LAN MAC Address Spoofing*, Jan. 21, 2003.

* cited by examiner

*Primary Examiner*—Rafael Pérez-Gutiérrez
*Assistant Examiner*—Liton Miah
(74) *Attorney, Agent, or Firm*—Baker Botts L.L.P.

(57) ABSTRACT

Methods, apparatuses and systems directed to detecting address spoofing in wireless networks by, after receiving a wireless management frame, transmitting verification messages to determine whether a given wireless node (e.g., a wireless access point, or wireless client) has legitimately lost its connection state.

28 Claims, 8 Drawing Sheets

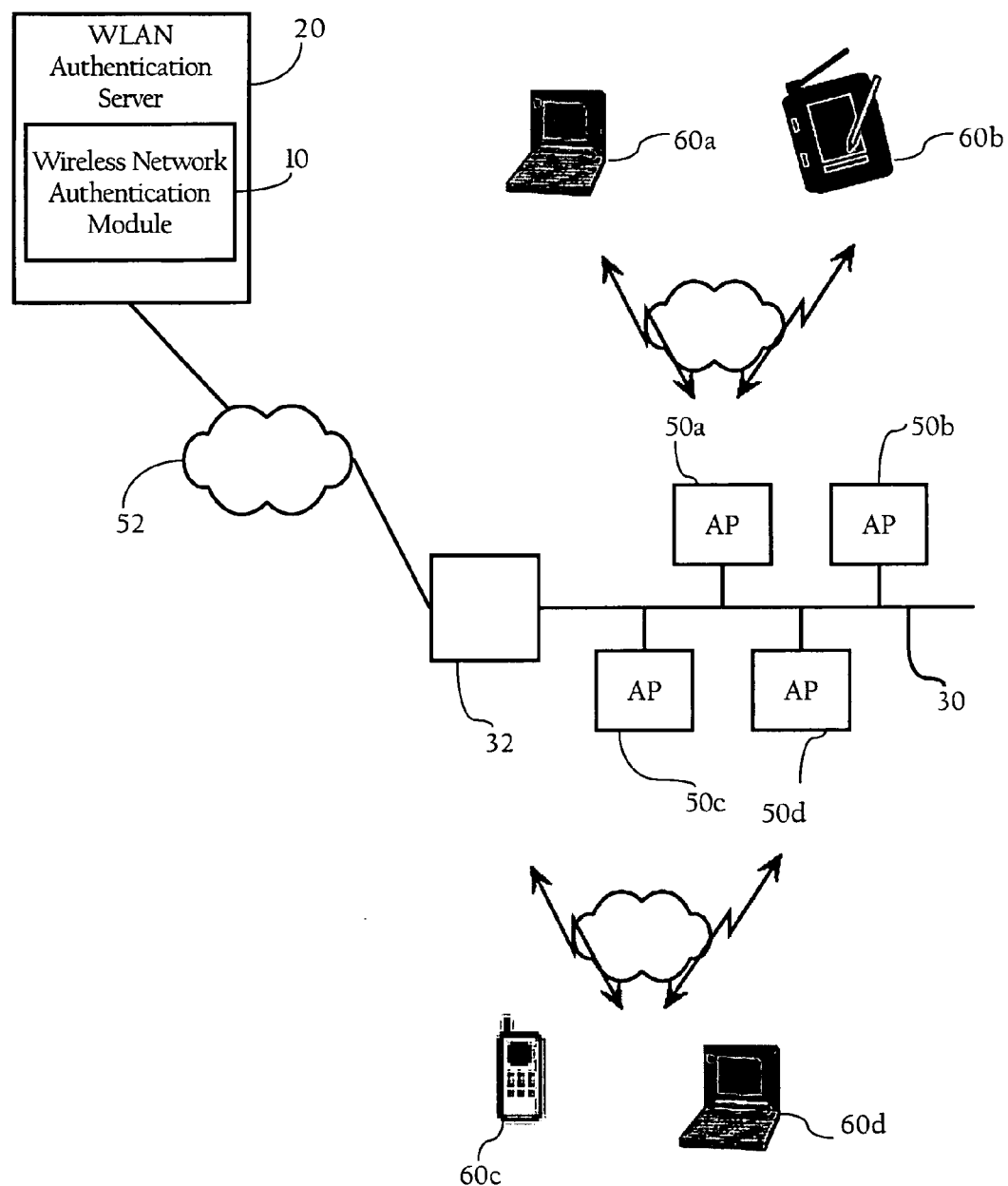
Fig._1A

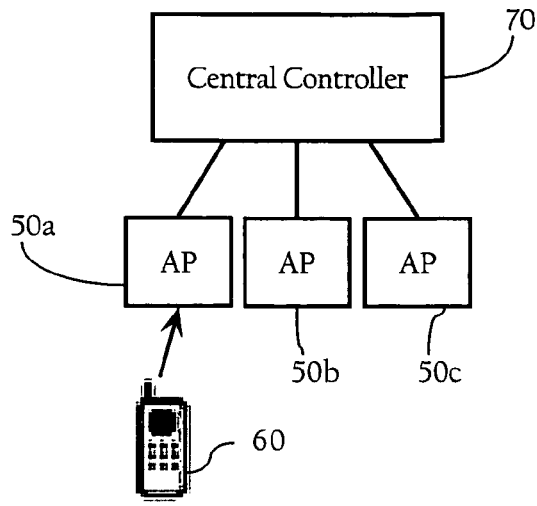
Fig._1B
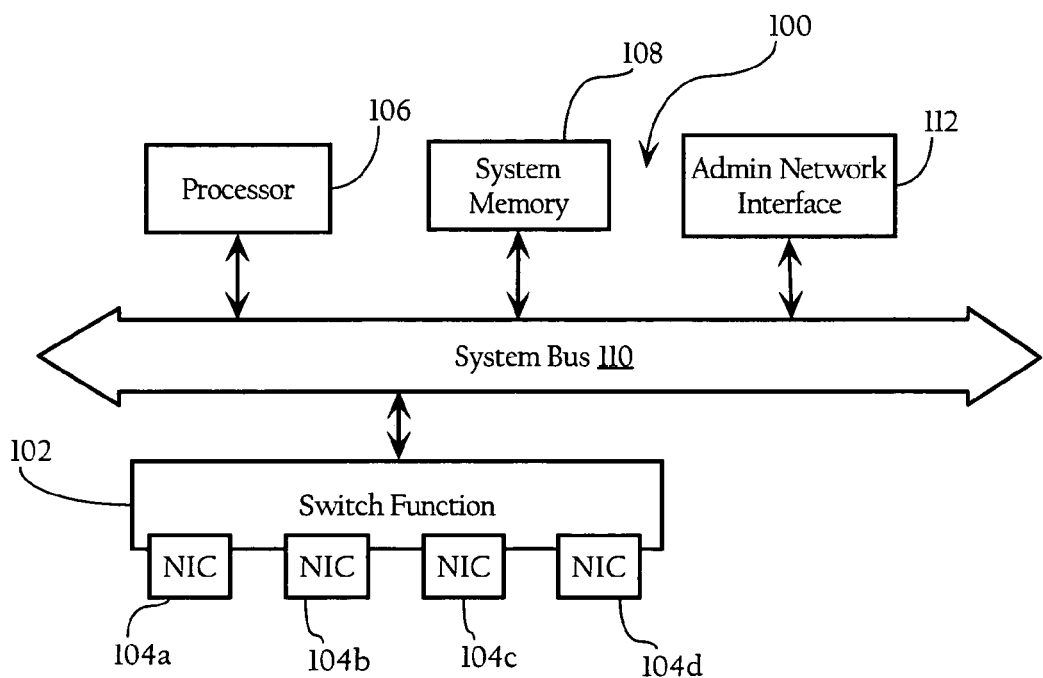
Fig._1C

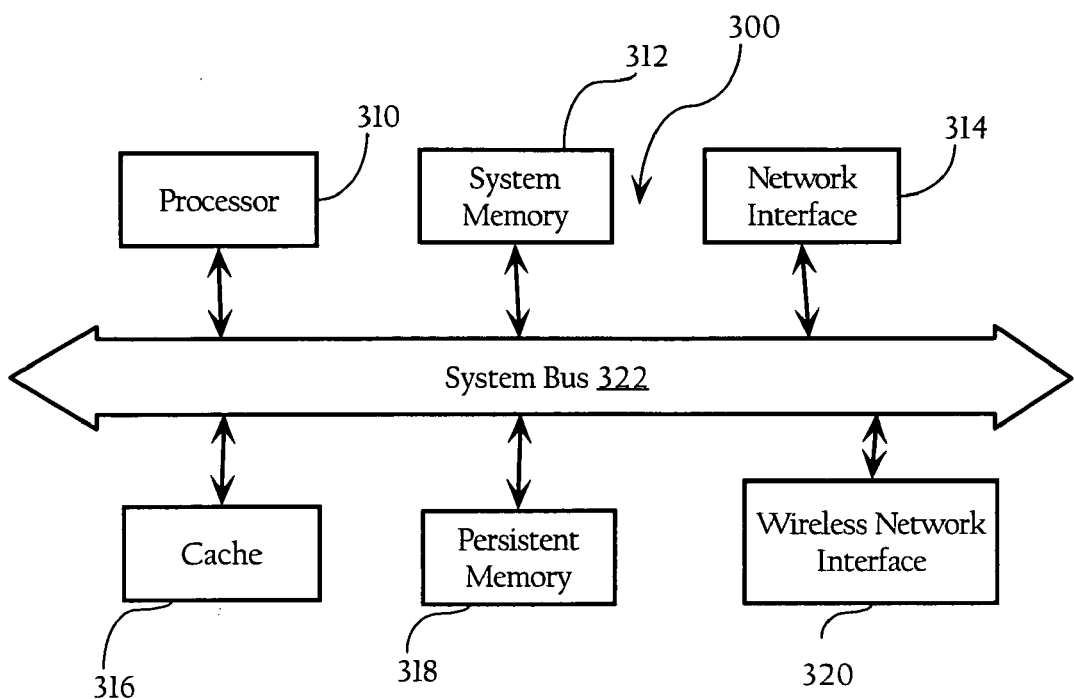
Fig._2

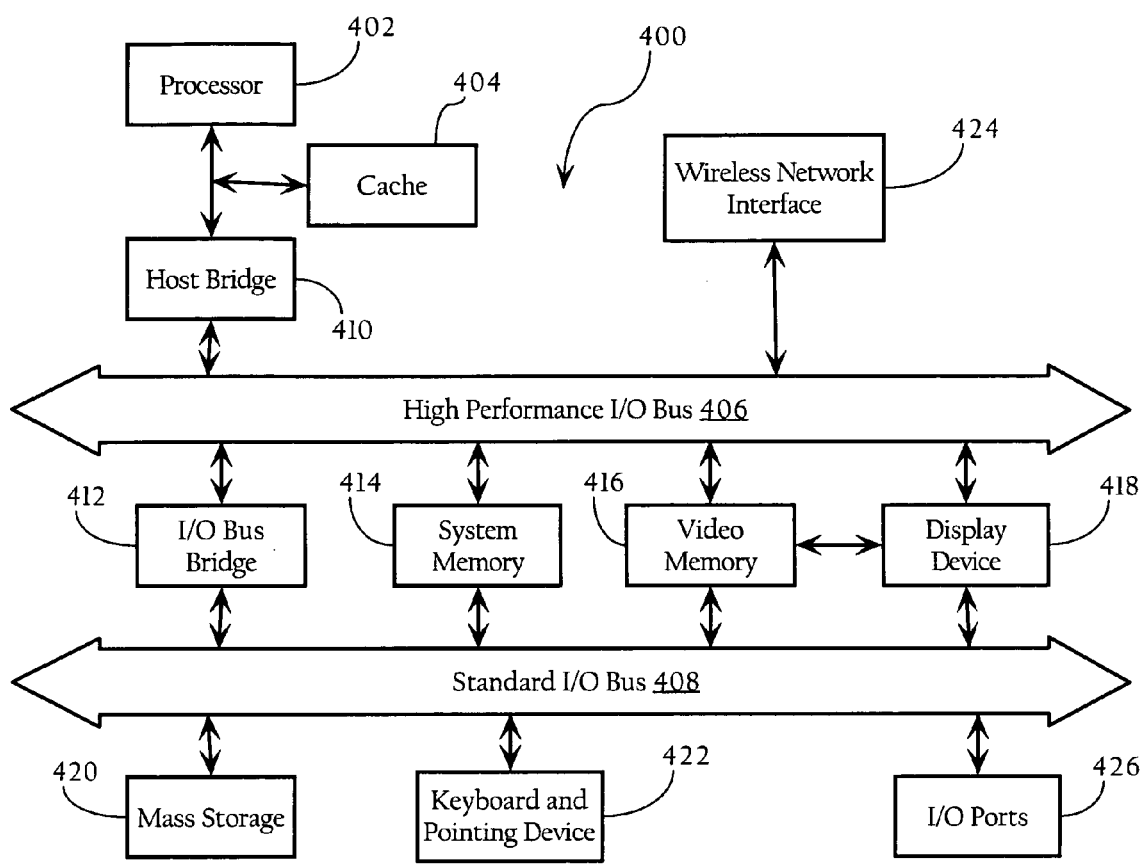
Fig._3

Fig._5

DETECTING ADDRESS SPOOFING IN WIRELESS NETWORK ENVIRONMENTS

FIELD OF THE INVENTION

The present invention relates to wireless networks and, more particularly, to methods, apparatuses, and systems directed to detecting address spoofing in wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public areas. This inflection point has highlighted not only the limitations of earlier-generation systems, but also the changing role that WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Unauthorized access to wireless networks is a growing security issue. Address spoofing is one method used to gain unauthorized access to a wireless network, or to launch denial of service attacks. For example, an impostor user may transmit messages to an authorized network element (e.g., wireless access point) using the Media Access Control (MAC) address of an authorized user. Similarly, an impostor network element may transmit messages to an authorized network element (e.g., wireless access point) using the MAC address of an authorized wireless access point.

The IEEE 802.11i standard defines a mechanism that secures user data frames. This mechanism uses 802.1X for authentication, and defines a key exchange mechanism that provisions a key on both the station and the wireless access point. This key is used to derive an encryption key used to encrypt user frames, as well as other session keys that can be used to compute Message Integrity Codes that allow frames to be authenticated. This standard prevents malicious spoofing of user frames, but does not protect the management frames. Because the 802.1X and key exchange occur after the association phase, the association messages are in the clear (i.e., unsecured). Once a key has been exchanged, it is possible to secure an association and 802.11 authentication messages.

The IEEE 802.11w standard defines a mechanism that secures Media Access Control (MAC) Management Frames. This mechanism allows for an expanded 802.1X and key exchange phase that occurs after the association phase. However, a wireless access point also accepts unsecured association and authentication messages, because the wireless infrastructure does not know whether a wireless client has lost its state (i.e., lost its connection to the wireless network) either through a reboot or through some other mechanism.

One problem with this approach is that in order to allow wireless clients, which may have crashed or rebooted, to reconnect to the wireless access point, the infrastructure allows for 802.11 association and authentication messages to be accepted unsecured. Accepting unsecured messages, however, allows for a malicious node to send spoofed association requests, or other wireless management frames, in order to create problems such as a denial of service attack.

In light of the foregoing, a need in the art exists for methods, apparatuses, and systems that address the foregoing problems and facilitate the detection of address spoofing in wireless networks. Embodiments of the present invention substantially fulfill this need.

DESCRIPTION OF THE DRAWINGS

FIG. 1A is a topological diagram of the components in a wireless local area network (WLAN) system according to one implementation of the present invention.

FIG. 1B illustrates a hierarchical wireless network including a central controller, which may be used to facilitate the detection of address spoofing in a wireless network according to one implementation of the present invention.

FIG. 1C illustrates for didactic purposes a hardware system, which may be used to implement a central controller or wireless switch.

FIG. 2 illustrates for didactic purposes a hardware system, which may be used to implement a wireless access point.

FIG. 3 illustrates for didactic purposes a hardware system, which may be used to implement a wireless client.

DESCRIPTION OF PREFERRED EMBODIMENT(S)

A. Overview

Figure 4:
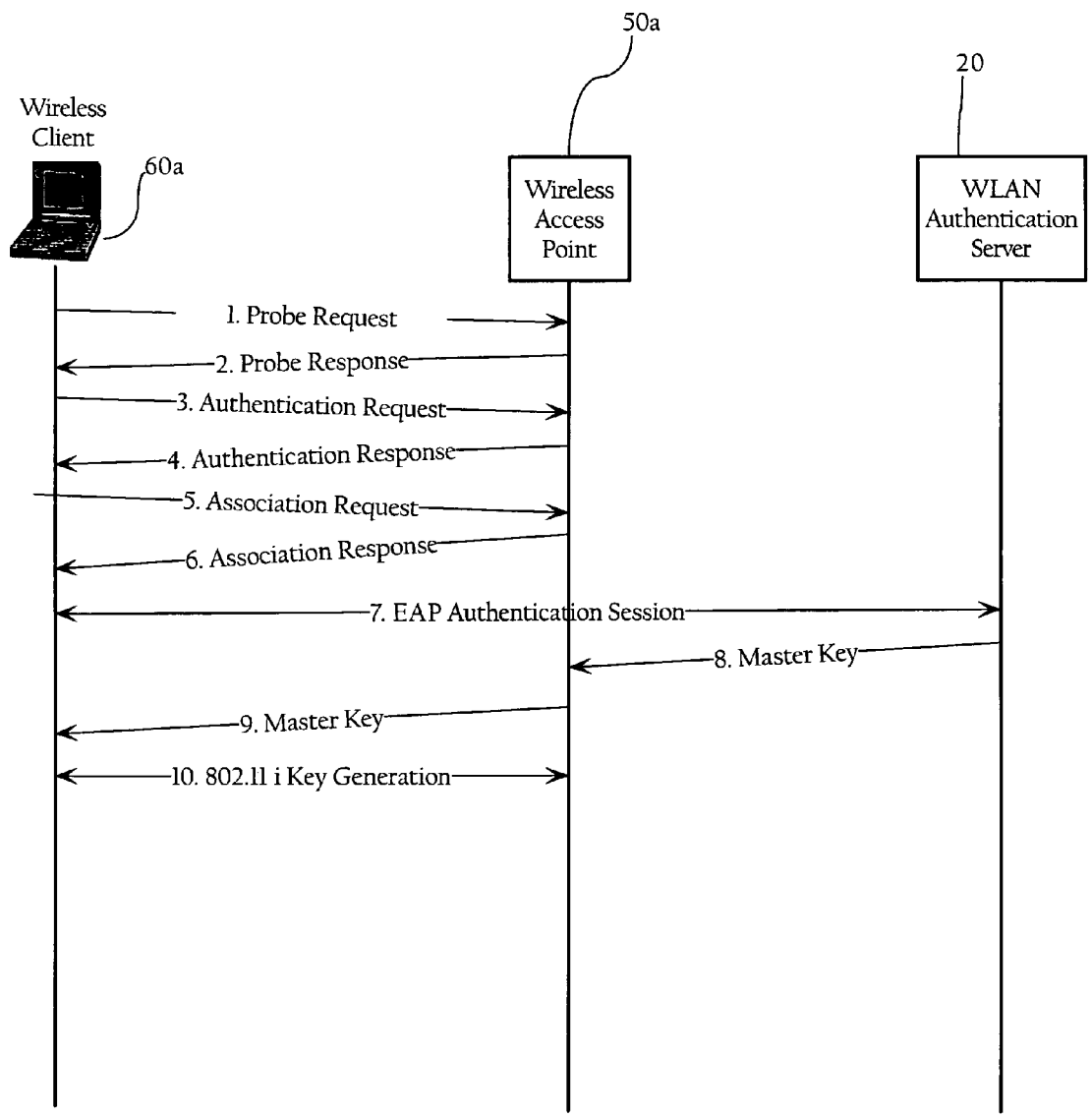
FIG. 4 is a diagram illustrating information flow among a wireless client, an access point, and an authentication module according to one implementation of the present invention.

The present invention provides methods, apparatuses, and systems directed to detecting address spoofing in wireless networks by, after receiving a wireless management frame, transmitting verification messages to determine whether a given wireless node (e.g., a wireless access point, or wireless client) has legitimately lost its connection state. According to one implementation of the present invention, if a wireless client and a wireless access point share a security association, and the wireless access point subsequently receives an unsecured association request or unsecured authentication request, the wireless access point sends a secured verification message to the wireless client using the existing security association. A secured verification message, in one implementation, is a verification message that may be encrypted with an encryption key and/or may be authenticated using a message integrity code (MIC). If the wireless client had legitimately disconnected and/or lost its security state information, and is now attempting to re-associate with the wireless access point, the wireless client would not respond to the verification message, because the wireless client would not have been able to properly decrypt/authenticate and respond to the verification message. Accordingly, an absence of a response to the verification message indicates that the association/authentication request may be from the wireless client, which has indeed lost its connection state information. However, a response to the verification message indicates that the association/authentication request may be spoofed and that the association/authentication request may have been sent by a rogue wireless client. Specifically, because the legitimate wireless client, still connected using the existing security association and able to decrypt/authenticate the verification message, would generally have no need to transmit authentication or association requests to the wireless access point. Accordingly, the wireless access point may optionally apply a security policy if it receives a response to the verification message.

The 802.11 standard specifies that an access point receiving a frame from a wireless client for which it has no state must respond with a de-authentication message. Adherence to the standard in this case creates possibilities for a new denial of service attack. In another implementation, the wireless client may implement methods for detecting whether management frames received from a wireless access point are spoofed. For example, if the wireless client and the wireless access point share a security association, and the wireless client subsequently receives an unsecured disassociation frame or unsecured de-authentication frame, the wireless client acknowledges the disassociation/de-authentication frame and sends a secured verification message to the wireless access point using the existing security association. As described above, a secured verification message is a verification message that may be encrypted with an encryption key and/or authenticated using a MIC. If the wireless access point had legitimately disassociated/de-authenticated from the wireless client, the wireless access point would not respond to the verification message, because the wireless access point would no longer maintain the security association and therefore not be able to decrypt/authenticate the verification message and respond to it. Accordingly, an absence of a response to the verification message indicates that the disassociation/de-authentication frame was legitimately from the wireless access point. However, a response to the verification message indicates that the disassociation/de-authentication frame received by the wireless client before sending the verification message may not be legitimate and may have been sent by a rogue wireless access point. Specifically, receiving a response to the verification message from the wireless access point suggests that the wireless access point has not disconnected the wireless client and has maintained the security association with the wireless client. Accordingly, the wireless client may optionally apply a security policy if a response to the verification message is received. In one implementation, a security policy may include, for example, disregarding the disassociation/de-authentication frame, reporting the presence of a rogue device sending a disassociation/de-authentication frame.

B. Exemplary Wireless Network System Architecture

B.1. Network Topology

A network environment including a wireless local area network (WLAN) according to one implementation of the present invention is shown in FIG. 1A. In a specific embodiment of the present invention, the system includes a wireless network authentication module 10 running on a WLAN authentication server 20, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN authentication server 20 and wireless clients via wireless access points 50. Of course, network 52 can include a variety of network segments, transmission technologies and components, such as terrestrial WAN links, satellite links, optical fiber links, and cellular links; network 52 could also be a campus LAN. LAN 30 may be a LAN or LAN segments implemented by an Ethernet switch (not shown) or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN authentication server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points. Of course, the present invention can be incorporated into a wide variety of wireless network architectures without departing from the scope of the present invention.

While FIG. 1A illustrates one implementation in which the wireless network authentication module 10 is implemented in WLAN authentication server 20, in other implementations, wireless network authentication module 10 may be implemented in a central controller 70. FIG. 1B illustrates a central controller 70, which may be used to facilitate the detection of address spoofing in a wireless network according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented with a wireless switch, the central controller 70 is operative to communicate with light-weight wireless access points. Of course, other control points in the wireless network infrastructure can be used to facilitate detection of address spoofing described herein.

FIG. 1C illustrates for didactic purposes a hardware system 100, which may be used to implement a central controller or wireless switch according to one implementation of the present invention. As FIG. 1C shows, in one implementation, the central control elements each comprise a switch function or fabric 102 comprising a network interface 104a (e.g., a Ethernet adapter) for connection to network 52 and corresponding network interfaces 104b, 104c, and 104d for connection to the access elements, a processor 106, a memory 108, one or more software modules, stored in memory 108, including instructions for performing the functions described herein, and a system bus 110 operably connecting these components. The central control elements may optionally include an administrative network interface 112 allowing for administrative access for such purposes as configuration and diagnostic access.

B.2. Wireless Access Point

FIG. 2 illustrates for didactic purposes a hardware system 300, which may be used to implement a wireless access point 50a of FIG. 1. In one implementation, the wireless access point 300 comprises a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP) or Configuration and Provisioning of Wireless Access Points (CAPWAP) Protocol, Cisco® Discovery Protocol (CDP) modules, wireless access point modules, Simple Network Management Protocol (SNMP) functionality, etc.) and device drivers (e.g., network and WLAN interface drivers) stored in persistent memory 318 (e.g., a hard disk drive, flash memory, etc.). At start up, these software components are loaded into system memory 312 and then accessed and executed by processor 310.

B.3 Wireless Client

FIG. 3 illustrates for didactic purposes a hardware system 400, which may be used to implement a wireless client 60 of FIG. 1. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. A wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 400 perform their conventional functions known in the art. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in discrete hardware or firmware.

While FIG. 3 illustrates, for didactic purposes, the hardware architecture of a wireless client according to one implementation of the present invention, the present invention, however, may be implemented on a wide variety of computer system architectures, such as dual-mode cellular phones (e.g., cellular plus 802.11 capable devices), wireless VoIP phones, Personal Digital Assistants (e.g., converged devices which support WLAN data+voice and cellular), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, Symbian operating systems, and the like.

C. Protection of Wireless Management Frames

FIG. 4 is a diagram illustrating information flow among a wireless client 60a, a wireless access point 50a, and a WLAN authentication server 20, according to one implementation of the present invention, directed to establishing a security association for a wireless connection between a wireless access point and a wireless client. In one implementation, wireless client 60a may broadcast a probe request frame to discover a wireless access point 50a, and wireless access point 50a may respond with a probe response frame (Ref. Nos. 1 and 2). In a similar manner, wireless client 60a and wireless access point 50a may exchange authentication and association frames (Ref. Nos. 3-6). After successful completion of the message handshakes, wireless access point 50a may permit an Extensible Authentication Protocol (EAP) authentication session between wireless client 60a and WLAN authentication server 20 (Ref. No. 7). After a successful EAP authentication session, in one implementation, WLAN authentication server 20 may generate and distribute master keys (e.g., Pairwise Master Keys) to wireless access point 50*a* and wireless client 60*a* (Ref. Nos. 8 and 9). Wireless client 60*a* and wireless access point 50*a* may then generate session keys (e.g., Pairwise Transient Keys) according to the IEEE 802.111 standard (Ref. No. 10). In one implementation, the WLAN authentication server may implement the RADIUS or Diameter protocols. Still further, in one implementation, the authentication functionality of server 20 may be integrated into wireless access point 50*a*.

In one implementation, encryption and authentication of frames transmitted between wireless client 60*a* and wireless access point 50*a* may involve a number of different key types. For example, wireless client 60*a* and wireless access point 50*a* may use a set of link or session keys to encrypt and authenticate unicast frames transmitted between wireless client 60*a* and access point 50*a*. In one implementation, wireless access point 50*a* may use a set of group or broadcast keys for encryption and authentication of broadcast frames. In one implementation, a separate set of link and/or broadcast keys may be used to encrypt and/or authenticate wireless management frames. Alternatively, in one implementation, the same sets of keys may be used for data frames, control frames, and management frames transmitted between wireless client 60*a* and wireless access point 50*a*. Generally, wireless access points and clients store the resulting security state or association information for use during the wireless connection. The resulting session keys can then be used to encrypt wireless frames, and to compute message integrity codes.

D. Detecting Address Spoofing by a Rogue Wireless Client

As described above, after a wireless client 60*a* and a wireless access point 50*a* establish a security association, if wireless access point 50*a* subsequently receives an unsecured authentication or association request with a source address identifying the wireless client 60*a*, wireless access point 50*a* can verify whether the request is legitimate, as described in more detail below. Wireless access point 50*a* can be configured to apply the verification functionality described herein in response to receipt of either an association request or an authentication request. In another implementation, wireless access point 50*a* can be configured to execute the verification functionality in response to both request types.

Figure 5:
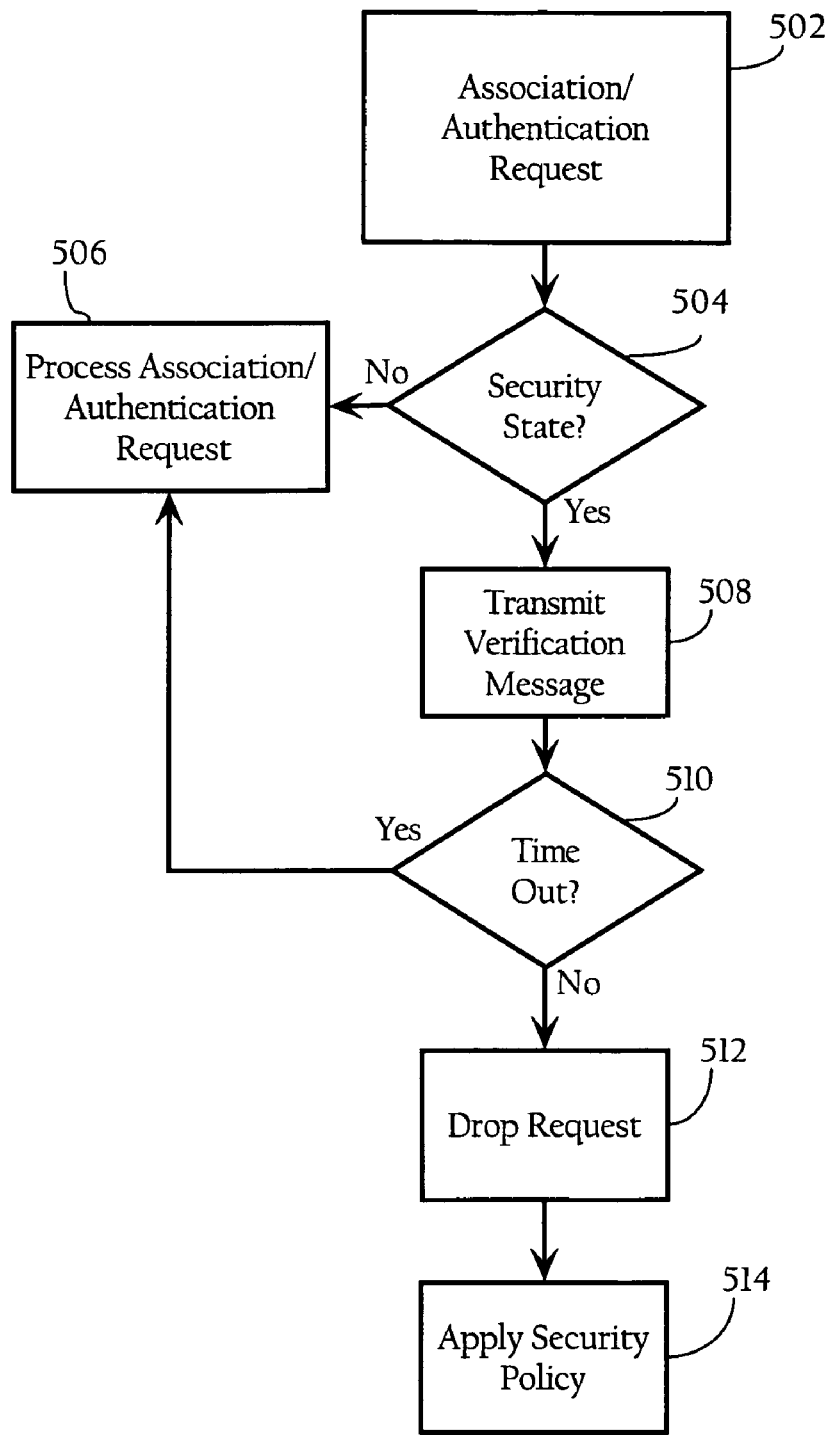
FIG. 5 is a flow chart illustrating a process flow, according to one implementation of the present invention, implemented at a wireless access point.

FIG. 5 is a flow chart illustrating a process flow, according to one implementation of the present invention, implemented at wireless access point 50*a*. Wireless access point 50*a* receives a connection request frame (e.g., an authentication request, association request, and/or other connection request frame) from a wireless client 60*a* (502). Wireless access point 50*a* then determines whether a valid security state exists for the wireless client identified in the source address field of the connection request frame (504). A security state would exist if wireless client 60*a* has previously associated with wireless access point 50*a*. A security state, in one implementation, is maintained in a security state data structure (e.g., a table) that stores security state information. In one implementation, security state information may include a MAC address of a wireless client, pairwise master and transient keys (PMK and PTK, respectively), and possibly other security state information (such as a time stamp indicating when the last security association was established). In one implementation, a valid security state exists if the security state was established (as indicated by the time stamp) within a threshold period of time.

A security state would not exist if wireless client 60*a* had legitimately disassociated for some reason and is attempting to re-associate with wireless access point 50*a*, or had not associated with the wireless access point within some period of time. Accordingly, if a valid security state does not exist, wireless access point 50*a* processes the authentication and/or associate request(s) (506). However, if a valid security state exists, wireless access point 50*a* transmits a secured verification message to wireless client 60*a*, where the verification message is encrypted using information in the existing security association (e.g., a link or session key) (508). In one implementation, a secured verification message may be encrypted with an encryption key such that only wireless client 60*a* can decrypt the verification message. In another implementation, a secured verification message may be transmitted in the clear but includes a message integrity code (MIC) such that wireless client 60*a* can authenticate the verification message. In another implementation, a secured verification message may include a MIC and may also be encrypted. The protection and authentication of wireless management frames can be accomplished by a variety of cryptographic technologies, such as symmetric and asymmetric encryption algorithms, hash functions and the like. In one implementation, the verification message is a message that causes a recipient wireless node to transmit a response, if it can properly decrypt/authenticate the message. In one implementation, either or both the wireless clients and the access points are configured to respond to verification messages. The verification message may be a so-called "Link Test" message according to the CCx protocol of Cisco Systems, Inc. of San Jose, Calif., or some other suitable message type. In other implementations, the verification message may be some other link layer message type to which a response is generated; however, wireless management frame types directed to connection set up or termination (e.g., association requests, etc.) should generally not be used as verification messages. In other embodiments, the verification message may be a network layer message, such as an Internet Control Message Protocol (ICMP) ECHO request. In yet another implementation, the present invention contemplates extensions to the IEEE 802.11 protocol directed to a special verification message frame type. In one implementation, the verification message is encrypted using a unicast key, or alternatively, a broadcast session key.

If wireless client 60*a* had legitimately terminated its wireless connection or otherwise lost its security state information (such as during a reboot), the wireless client 60*a*, as discussed above, would not respond to the verification message, because, having lost the session keys, the wireless client 60*a* would not be able to decrypt/authenticate and process the verification message. Hence, an absence of the response to the verification message indicates that the association/authentication request may legitimately be from the wireless client 60*a*. Accordingly, if a response to the verification message times out (510) (i.e., wireless access point 50*a* does not receive a response to the verification message in 3 seconds, for example), wireless access point 50*a* processes the authentication and/or associate request(s) (506). In one implementation, receiving a response to the verification message indicates that the wireless client 60*a* identified in the association/authentication request has not lost its connection and security state, and further suggests that a malicious node has spoofed the wireless client 60*a* by using the MAC address of the wireless client 60*a* in a spoofed association/authentication request. Accordingly, if wireless access point 50*a* receives a response to the verification message, wireless access point 50*a* drops the association/authentication request (512). Wireless access point 50*a* may optionally apply one or more additional security policies (514), which may involve generating a security alert message, incrementing a spoofed frame counter, and the like.

Figure 6:
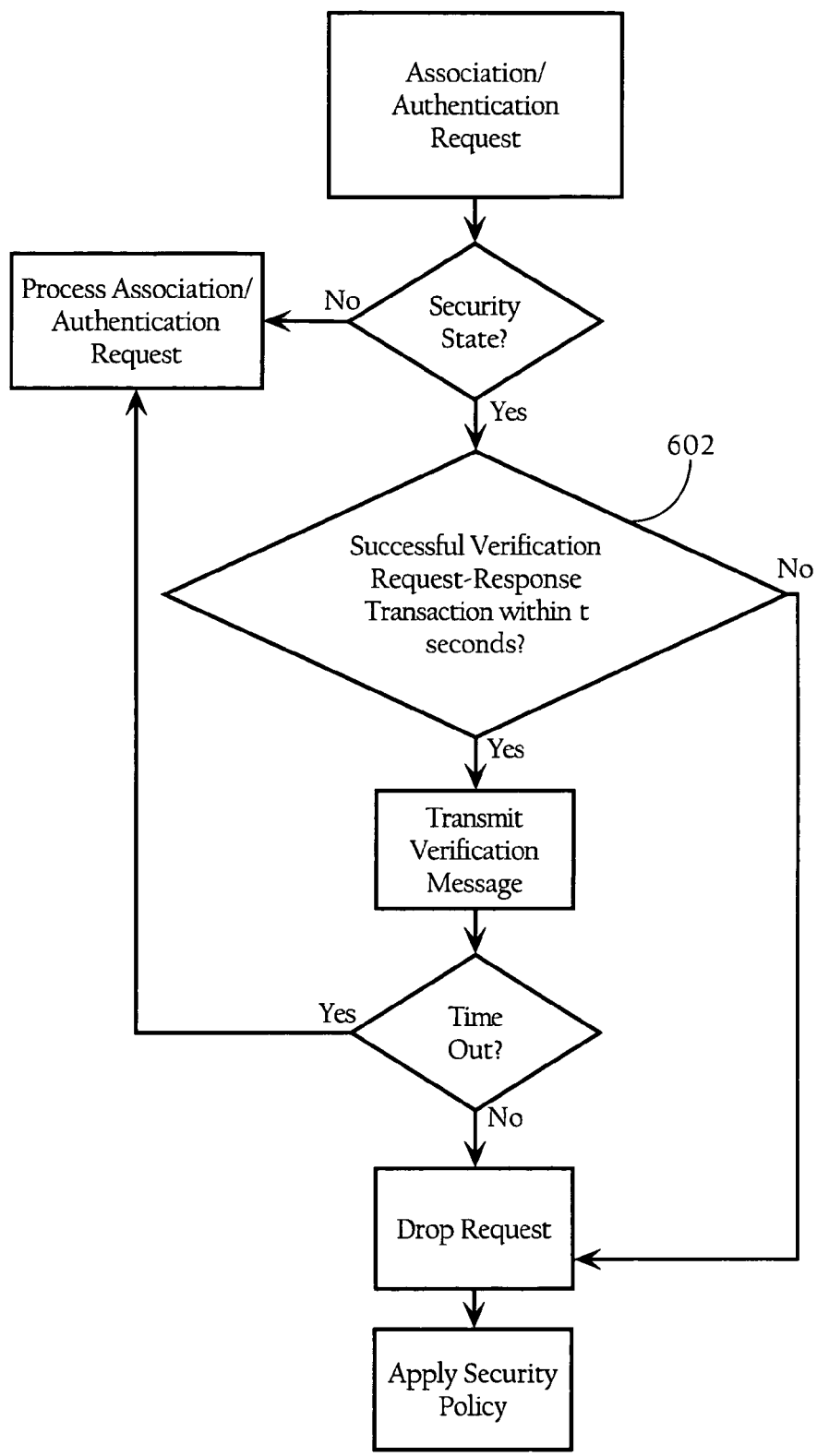
FIG. 6 is a flow chart illustrating a process flow, according to another implementation of the present invention, implemented at a wireless access point.

FIG. 6 is a flow chart illustrating a process flow, according another implementation of the present invention, implemented at a wireless access point. In one implementation, the process flow of FIG. 6 is the same as the process flow described in FIG. 5, except that the process flow of FIG. 6 includes an optimization where wireless access point 50a determines whether a verification transaction was already successful. For example, if a security state exists, wireless access point 50a determines whether successful link test or keep alive transactions are within a predefined time period (e.g., t=3 seconds) (602). If not, wireless access point 50a drops the request. If so, wireless access point 50a transmits a verification message. By checking whether a verification transaction was already successfully completed within a threshold period of time, transmission of verification messages and corresponding use of the wireless medium is reduced.

E. Detecting Address Spoofing by a Rogue Wireless Access Point

As described above, after a wireless client 60a and a wireless access point 50a share a security association, if wireless client 60a subsequently receives an unsecured disassociation or de-authentication frame, wireless client 60a can verify whether the disassociation/de-authentication frame is legitimate and not spoofed.

Figure 7:
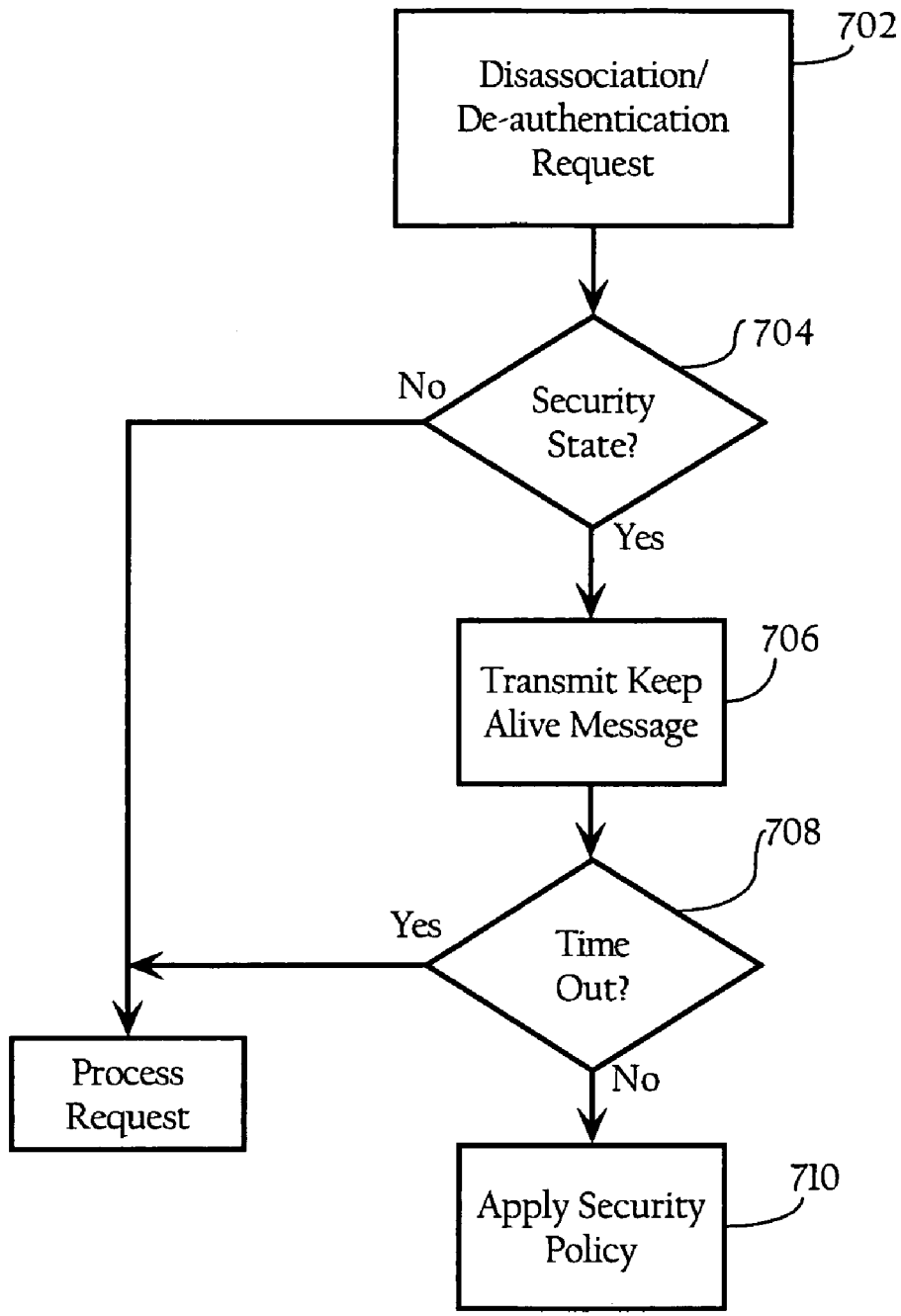
FIG. 7 is a flow chart illustrating a process flow, according to one implementation of the present invention, implemented at a wireless client.

FIG. 7 is a flow chart illustrating a process flow, according to one implementation of the present invention, implemented at a wireless client. As described above, if a wireless client 60a and a wireless access point 50a have established a security association, and wireless client 60a subsequently receives an unsecured disassociation frame, unsecured de-authentication frame, or other connection-terminating frame (702). Wireless client 60a determines if a security state exists (704). If not, wireless access point 50a processes the connection-terminating frame. If a security state exists (704), wireless client 60a sends a secured verification message to wireless access point 50a using a session key of the existing security association (706). In one implementation, a secured verification message may be encrypted with an encryption key such that wireless access point 50a can decrypt and process the verification message. In another implementation, a secured verification message may be unencrypted, but include a MIC such that wireless access point 50a can authenticate the verification message. In another implementation, a secured verification message may include a MIC and may also be encrypted. If wireless access point 50a had legitimately disassociated/de-authenticated from wireless client 60a, wireless access point 50a would not respond to the verification message, because wireless access point 50a would have deleted the wireless client's connection and security state information from its association tables and other data structures. Accordingly, an absence of a response to the verification message indicates that the access point 50a no longer has the session keys required to decrypt/authenticate and process the verification message, and that the disassociation/de-authentication frame was legitimately from the wireless access point 50a. Accordingly, if a response to the verification message times out (708), wireless client 60a processes the connection-terminating message. However, receiving a response to the verification message indicates that the wireless access point 50a is currently maintaining the wireless connection (including the connection and security state information for the wireless client 60a) and that the disassociation/de-authentication request may not be legitimate and may have been sent by a malicious node that has spoofed the wireless access point 50a. Accordingly, if wireless client 60a receives a response to the verification message from the wireless access, wireless client 60a may apply one or more security policies (710), such as dropping the connection-terminating message, transmitting a notification to wireless access point 50a, etc.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. An apparatus, comprising:
    one or more processors;
    a memory;
    a network interface; and
    a wireless network application operable to:
        establish a secured connection with a wireless node, wherein security-association information corresponding to the secured connection is stored in the memory and used to secure wireless frames transmitted by and to the wireless node;
        access an unsecured wireless management frame comprising a source address identifying the wireless node;
        validate, if the memory stores security-state information associated with the wireless node, the unsecured wireless management frame by causing the network interface to transmit a secured verification message to the wireless node and awaiting a response to the secured verification message;
        process the unsecured wireless management frame if the response times out; and
        apply one or more security policies if the response to the secured verification message from the wireless node is received.

2. The apparatus of claim 1, wherein the wireless management frame is an authentication frame.

3. The apparatus of claim 1, wherein the security-state information comprises one or more session keys.

4. The apparatus of claim 1, wherein the secured verification message comprises a message integrity code.

5. The apparatus of claim 1, wherein the secured verification message is encrypted.

6. The apparatus of claim 1, wherein:
    the apparatus is a wireless access point;
    the network interface is a wireless network interface;
    the wireless network application is a wireless access-point application;
    the wireless node is a wireless client;
    the wireless management frame is at least a portion of a connection request message from the wireless client; and
    the wireless access-point application uses at least a portion of the security-state information associated with the wireless client to secure the verification message.

7. The apparatus of claim 1, wherein:
    the apparatus is a wireless client;
    the network interface is a wireless network interface;
    the wireless network application is a wireless network-driver application;
    the wireless node is a wireless access point; and the wireless management frame is at least a portion of a disconnection message from the wireless access point; and the wireless access-point application uses at least a portion of the security-state information associated with the wireless access point to secure the verification message.

8. The apparatus of claim 7, wherein the disconnection message is a disassociation request.

9. The apparatus of claim 7, wherein one or more of the security policies are operable to cause the wireless client to drop the disconnection message.

10. A method, comprising:
establishing a secured connection with a wireless node, wherein security-association information corresponding to the secured connection is used to secure wireless frames transmitted by and to the wireless node;
accessing an unsecured wireless management frame comprising a source address identifying the wireless node;
validating, if a memory associated with a wireless network application stores security-state information associated with the wireless node, the unsecured wireless management frame by causing a network interface to transmit a secured verification message to the wireless node and awaiting a response to the secured verification message;
processing the unsecured wireless management frame if the response times out; and
applying one or more security policies if the response to the secured verification message from the wireless node is received.

11. The method of claim 10, wherein the wireless management frame is an authentication frame.

12. The method of claim 10, wherein the security state information comprises one or more session keys.

13. The method of claim 10, wherein the secured verification message comprises a message integrity code.

14. The method of claim 10, wherein the secured verification message is encrypted.

15. The method of claim 10, wherein:
the wireless node is a wireless client;
the wireless management frame is at least a portion of a connection request message from the wireless client;
the network interface is a wireless network interface;
the wireless network application is a wireless access-point application; and
the method comprises using at least a portion of the security-state information associated with the wireless client to secure the verification message.

16. The method of claim 10, wherein:
the wireless node is a wireless access point;
the wireless management frame is at least a portion of a disconnection message from the wireless access point;
the network interface is a wireless network interface;
the wireless network application is a wireless network-driver application; and
the method comprises using at least a portion of the security-state information associated with the wireless access point to secure the verification message.

17. The method of claim 16, wherein the disconnection message is a disassociation request.

18. The method of claim 16, wherein one or more of the security policies are operable to cause the wireless client to drop the disconnection message.

19. Logic encoded in one or more media for execution and when executed operable to:
establish a secured connection with a wireless node, wherein security-association information corresponding to the secured connection is used to secure wireless frames transmitted by and to the wireless node;
access an unsecured wireless management frame comprising a source address identifying the wireless node;
validate, if a memory associated with a wireless network application stores security-state information associated with the wireless node, the unsecured wireless management frame by causing a network interface to transmit a secured verification message to the wireless node and awaiting a response to the secured verification message;
process the unsecured wireless management frame if the response times out; and
apply one or more security policies if the response to the secured verification message from the wireless node is received.

20. The logic of claim 19, wherein the wireless management frame is an authentication frame.

21. The logic of claim 19, wherein the security state information comprises one or more session keys.

22. The logic of claim 19, wherein the secured verification message comprises a message integrity code.

23. The logic of claim 19, wherein the secured verification message is encrypted.

24. The logic of claim 19, wherein:
the wireless node is a wireless client;
the wireless management frame is at least a portion of a connection request message from the wireless client;
the network interface is a wireless network interface;
the wireless network application is a wireless access-point application; and
the logic is operable to use at least a portion of the security-state information associated with the wireless client to secure the verification message.

25. The logic of claim 19, wherein:
the wireless node is a wireless access point;
the wireless management frame is at least a portion of a disconnection message from the wireless access point;
the network interface is a wireless network interface;
the wireless network application is a wireless network-driver application; and
the logic is operable to use at least a portion of the security-state information associated with the wireless access point to secure the verification message.

26. The logic of claim 25, wherein the disconnection message is a disassociation request.

27. The logic of claim 25, wherein one or more of the security policies are operable to cause the wireless client to drop the disconnection message.

28. A system, comprising:
a memory;
a network interface;
means for establishing a secured connection with a wireless node, wherein security-association information corresponding to the secured connection is stored in the memory and used to secure wireless frames transmitted by and to the wireless node;
means for accessing an unsecured wireless management frame comprising a source address identifying the wireless node;
means for validating, if the memory stores security-state information associated with the wireless node, the unsecured wireless management frame by causing the network interface to transmit a secured verification message to the wireless node and awaiting a response to the secured verification message;
means for processing the unsecured wireless management frame if the response times out; and
means for applying one or more security policies if the response to the secured verification message from the wireless node is received.

* * * * *